P. C. CLARK.
VEHICLE TOP.
APPLICATION FILED JULY 7, 1915.
1,191,669.
Patented July 18, 1916.
2 SHEETS—SHEET 2.
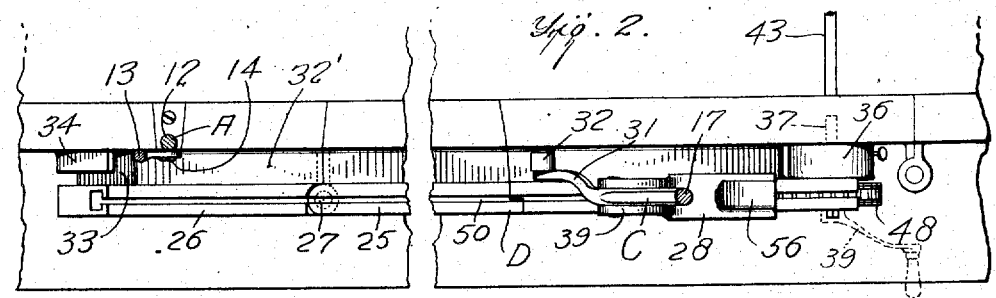
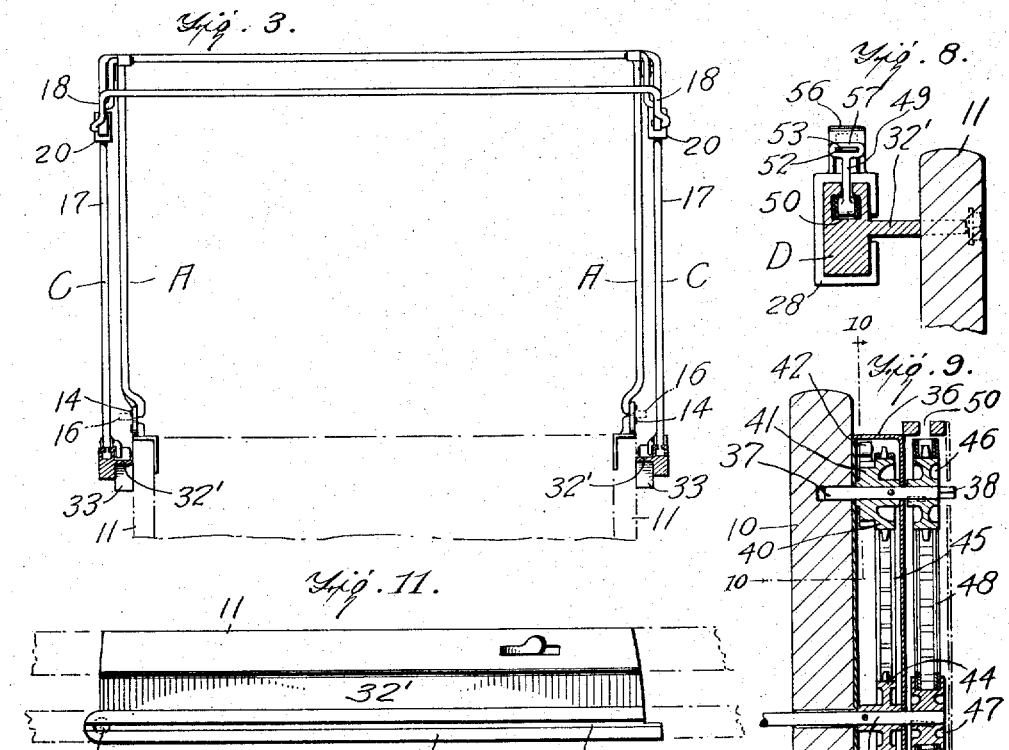
INVENTOR
PERLEY C. CLARK,
BY
ATTORNEYS
WITNESSES:

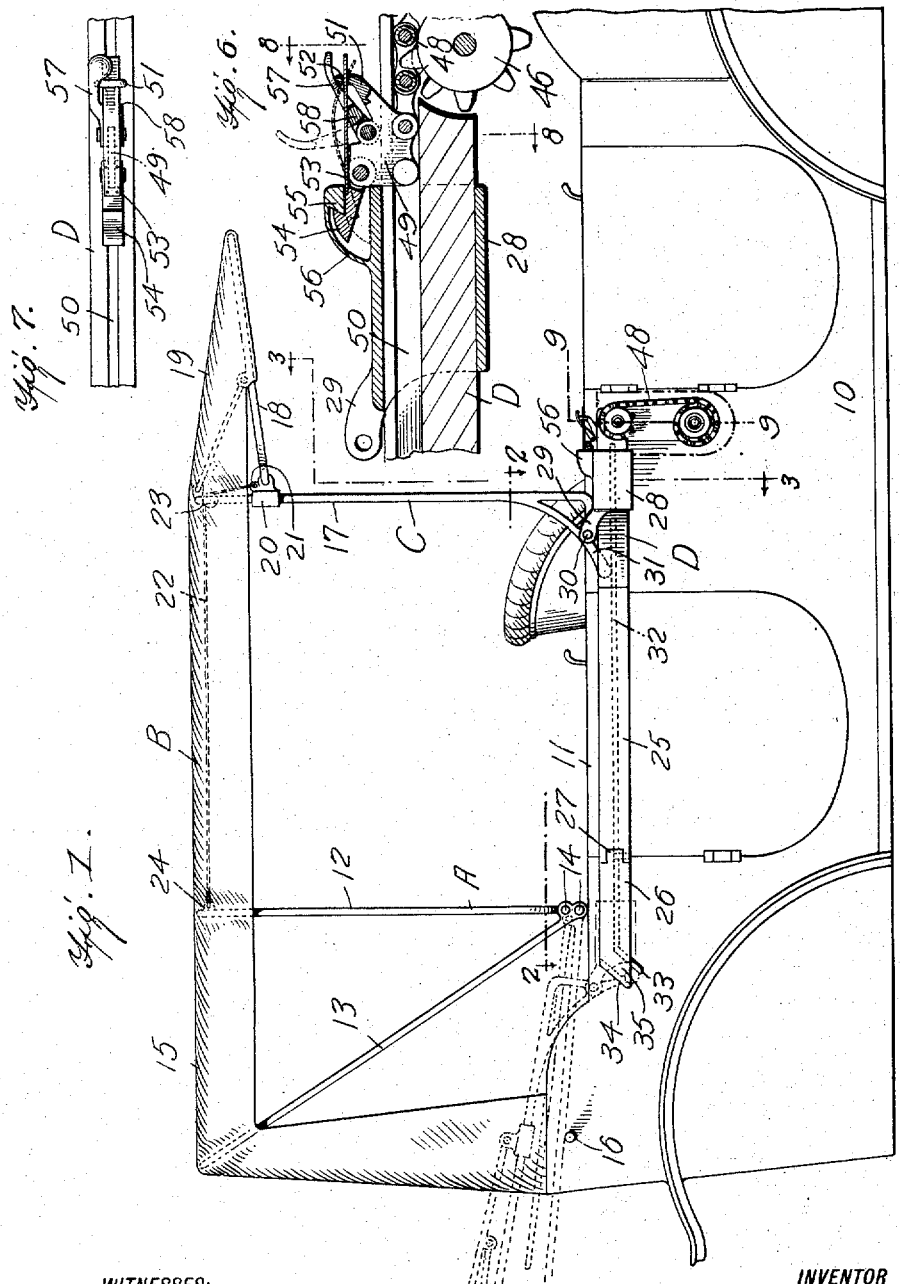

UNITED STATES PATENT OFFICE.

PERLEY C. CLARK, OF MONTROSE, COLORADO.

VEHICLE-TOP.

1,191,669.  Specification of Letters Patent.  Patented July 18, 1916.

Application filed July 7, 1915. Serial No. 38,529.

*To all whom it may concern:*

Be it known that I, PERLEY C. CLARK, a citizen of the United States, and a resident of Montrose, in the county of Montrose and State of Colorado, have invented an Improvement in Vehicle-Tops, of which the following is a specification.

This invention relates to vehicle tops and more particularly to a foldable top for automobiles.

One of the objects of the present invention is to provide a novel construction and arrangement of parts designed to facilitate the raising and lowering of the top by providing means operable from the driver's seat and connected to said top so that the same may be quickly and easily adjusted.

Another object is the provision of a cover supporting device consisting of a rear pivoted frame and a front frame movable horizontally relative to said rear frame in order that the cover, when raised, may be sufficiently extended to protect the body of the vehicle and, when lowered, be effectively folded with the forward frame on top of the rear one.

A still further object of the invention is the provision of a vehicle top of this character which is comparatively simple in construction, durable and effective in use, and which may be readily applied to a vehicle.

The inventive idea involved is capable of receiving a variety of mechanical expressions, one of which, for the purpose of illustrating the invention, is shown in the accompanying drawings, in which—

Figure 1 is a side elevation of a conventional form of automobile showing the invention applied thereto. Fig. 2 is a section taken on the line 2—2 of Fig. 1. Fig. 3 is a similar view taken on the line 3—3 of Fig. 1. Fig. 4 is a fragmentary detail perspective of the front frame for supporting the cover. Fig. 5 is a fragmentary side elevation on the line 5—5 of Fig. 4, of a portion of the front frame, showing the means for operating a portion thereof. Fig. 6 is a longitudinal section of a part of the operating mechanism. Fig. 7 is a top plan view of the catch mechanism shown in Fig. 6. Fig. 8 is a section on the line 8—8 of Fig. 6. Fig. 9 is a section on the line 9—9 of Fig. 1. Fig. 10 is a section on the line 10—10 of Fig. 9. Fig. 11 is a top plan of one of the doors of the vehicle showing a portion of the track member used in connection with the invention.

Referring to the drawings, the numeral 10 indicates a vehicle of any construction having the usual swinging doors 11. Carried by the body of the vehicle rearwardly of the doors 11 is a rear frame generally indicated by A. This rear frame consists of the bows 12 and 13 pivoted at 14 and adapted to support the rear portion 15 of the cover B. This rear frame is of ordinary construction and is adapted to fold backwardly, as usual, and is limited in its folding movement by means of a small stop 16 carried by the body of the vehicle.

The support for the cover B also comprises a forward frame generally indicated by C consisting of a horizontally movable bow 17 which is supported in a manner presently to be described. This forward frame also includes a small bow 18 adjustable relative to the bow 17 and adapted to support the front portion 19 of the cover B. The ends of the bow 18 are pivotally connected to sliding collars 20 mounted upon the vertical portions of the bow 17 and connected to each of said collars at 21 is one end of a flexible connection 22 which passes over a pulley 23 carried by the upper end of the bow 17, the other end of said connection being secured to the upper end of the rear bow 12 at 24, as shown in dotted lines in Fig. 1. It will be seen that after the frame A has been extended and the forward movement of the frame C continued, the flexible connection 22 will gradually become taut and cause the collars 20 to be raised along the bow 17 thus moving the bow 18 to the extended position shown in Fig. 1. In lowering the top, when the front frame C moves rearwardly, the weight of the bow 18 and collars 20 is sufficient to cause the latter to slide downwardly on the bow 17 so that when the frames are folded the parts will assume the position shown in dotted lines in Fig. 1.

Arranged on each side of the body of the vehicle adjacent the top thereof is a horizontally extending supporting and guiding track member generally indicated by D. This member is made in sections and includes an intermediate portion 25 secured to the door 11 and pivoted to the rear portion 26 as indicated at 27. This arrangement permits of the door 11 being freely opened and closed when the top of the vehicle is in either raised or lowered position. Mounted upon each member D is a slide 28 having ears 29 whereby the same are pivoted to the front frame C at 30 so that said frame is supported. The lower portion of the bow 17 of the front frame is provided with a rearward extension 31 having a roller 32 mounted upon its extremity and adapted to engage a ledge 32′ formed on the track member D intermediate the same and door 11 whereby the frame C is guided in its movements. At the rear end of the member D the same is provided with a small lateral extension 33 which coöperates with a deflector 34 to provide a guide slot 35 which receives the roller 32 when the frame C is being moved to folded position and causes said frame to be tilted to assume its final position on top of the rear frame A, as shown by the dotted lines in Fig. 1.

The means for actuating the slides 28 to raise and lower the frames A and C comprises a vertically arranged casing 36 secured to the exterior of the vehicle on each side thereof and adjacent the driver's seat, said casing having extending therethrough an operating shaft 37 the outer end of which is squared as indicated at 38 to receive an operating handle 39. The shaft 37 has thereon interiorly of the casing a sprocket 40 and a ratchet 41 formed integrally with said sprocket and adapted to be normally engaged by a spring pressed pawl 42 adapted to prevent rotation of said sprocket in one direction so that the frames A and C will be releasably retained in upright or extended positions. The lower end of the casing 36 has mounted therein a shaft 43 which extends through the body of the vehicle and across the same to the other side thereof where it projects into the other casing 36 mounted upon the opposite side of the vehicle. A sprocket 44 is mounted upon the shaft 43 interiorly of each of the casings 36, and connects with the sprocket 40 by means of a chain 45. Exteriorly of the casing 36 and on the outer side thereof the shafts 37 and 43 have sprockets 46 and 47 respectively mounted thereon, said sprockets being adapted to support a driven chain 48 which is wound about the sprocket 47 and passes over the sprocket 46 and has its adjacent end secured to a carriage 49, as shown in Fig. 6. This carriage 49, is mounted in a longitudinally extending slot 50 formed in the sections of the track member D and is adapted to be releasably connected to the slide member 28 whereby the latter is adjusted back and forth on said track member when the chain 48 is actuated. The carriage 49 comprises an upward extension 51 at one end thereof provided with a slot 52 in its extremity adapted to receive one end of a spring catch 53 the other end of which is provided with a latch 54 adapted to engage an enlargement 55 formed at the edge of a small housing 56, the latter being made integral with the slide member 28. In order to release the latch 54 from the enlargement 55, the carriage has pivoted thereto a lever 57 having a portion 58 adapted to engage the under side of the spring catch 53 and bend the same as indicated in dotted lines in Fig. 6, whereupon the latch 54 will be lowered and the slide 28 released from connection with the carriage 49.

In practice, assuming that the frames A and C are in folded position as shown in dotted lines in Fig. 1, and the carriage 49 is connected to the slide member 28 and it is desired to raise said frames to adjust the top to extended position. The operator will turn handle 39 which will impart rotation to the sprockets 46 and 47 through the medium of their connections with the shaft 37 and cause the chain 48 to be drawn forward over the sprocket 46 and wound upon the sprocket 47 until the slide 28 has reached the position shown at the right in Fig. 1 when the top B will have reached its fully extended position. The pawl 42 will engage one of the teeth of the ratchet 41 and will prevent rotation of the shaft 37 in the opposite direction so that the top will be held extended. When it is desired to lower the frames A and C the pawl 42 is first withdrawn from engagement with the ratchet 41 and latch 54 disconnected from the slide 28 whereupon the shaft 37 is then turned in the opposite direction so that the chain 48 will be unwound from the sprocket 47 and forced along the channel 50 of the track member D until the roller 32 strikes the deflector 34 thereby causing said roller to move along the guide slot 35 until the frames are in the dotted line position. It will be apparent that when the slide 28 reaches the extreme position at the left the chain 48 will extend along practically the entire length of the track member D so that in this position it will be impossible to open the door 11. The latch 54 being disconnected from the slide 28 will permit of the chain being again drawn forward and wound upon the sprocket 47 until said slide is in its forward position when the door 11 will be free to open.

I claim:—

1. In a vehicle top, the combination of a frame movable horizontally of the vehicle, a track member supporting said frame, a slide mounted on said track member, a carriage releasably connected to said slide, a casing supported on said vehicle, and means mounted both interiorly and exteriorly of said casing for operating said slide to raise and lower said frame.

2. In a vehicle top, the combination of a frame movable horizontally of the vehicle, a track member supporting said frame, a slide mounted on said track member, a carriage releasably connected to said slide, a casing supported on said vehicle, means mounted both interiorly and exteriorly of said casing for operating said slide to raise and lower said frame, and means associated with said casing for preventing operation of the last-named means in one direction.

3. In a vehicle top, the combination of a frame adjustable longitudinally of the vehicle, a slide supporting said frame, a carriage associated with said slide and including a spring catch member, means carried by the carriage for releasing said catch member from said slide, and means associated with said carriage for adjusting said slide to raise and lower said frame.

4. In a vehicle top, the combination of a frame movable horizontally of the vehicle, a track secured to said vehicle, a slide member mounted on said track and supporting said frame, a carriage releasably connected to said slide member, and a flexible element secured to said carriage and movable longitudinally of said track to raise and lower said frame.

5. In a vehicle top, the combination of a frame movable horizontally of the vehicle, a track secured to said vehicle, a slide member mounted on said track and supporting said frame, a carriage releasably connected to said slide member, a flexible element secured to said carriage and movable longitudinally of said track to raise and lower said frame, and a device for winding and unwinding said flexible element when the frame is raised and lowered, said carriage being adapted to be disconnected from said slide before the frame is moved from raised to lowered position, whereby to permit the rewinding of said flexible element after the frame is lowered.

6. In a vehicle top, the combination of a frame movable horizontally of the vehicle, a track member carried by the vehicle, a slide mounted on said track member for supporting said frame, a carriage also movable on said track member, a resilient member carried by said carriage and having a latch at one end thereof adapted to engage said slide, the lever pivoted to said carriage engaging said spring member whereby to release said latch to disconnect the carriage from the slide, and means for moving said slide and carriage longitudinally of the track member for raising and lowering said frame.

7. In a vehicle top, the combination of a frame movable longitudinally of the vehicle, a track secured to the vehicle, a slide member mounted on said track and supporting said frame, a carriage connected to said slide member and adapted to be disconnected therefrom before the frame is moved from raised to lowered position, and means for adjusting said carriage longitudinally of said track.

PERLEY C. CLARK.

Witnesses:
J. G. MILLER,
E. E. SCHUYLER.

Copies of this patent may be obtained for five cents each, by addressing the "Commissioner of Patents, Washington, D. C."